United States Patent [19]
Goodson et al.

[11] 4,107,401
[45] Aug. 15, 1978

[54] SUPER HIGH ENERGY DENSITY BATTERY

[75] Inventors: Forrest R. Goodson, Campbell; William H. Shipman, La Mesa; Joseph F. McCartney, Solana Beach, all of Calif.

[73] Assignee: The United States of America as represented by the Secretary of the Navy, Washington, D.C.

[21] Appl. No.: 871,877

[22] Filed: Jan. 24, 1978

[51] Int. Cl.$^2$ ............................................. H01M 6/14
[52] U.S. Cl. ................................. 429/101; 429/105; 429/199
[58] Field of Search ............... 429/101, 105, 199, 194, 429/218, 212, 213

[56] References Cited
U.S. PATENT DOCUMENTS

| | | | |
|---|---|---|---|
| 3,663,295 | 5/1972 | Baker | 429/102 |
| 3,990,915 | 11/1976 | Newman et al. | 429/194 |
| 4,052,539 | 10/1977 | Shropshire et al. | 429/194 |

Primary Examiner—Anthony Skapars
Attorney, Agent, or Firm—Richard S. Sciascia; Ervin F. Johnston

[57] ABSTRACT

A super high energy density battery which includes a lithium anode, a catholyte of liquid bromine trifluoride, and an electrolyte of antimony pentafluoride.

4 Claims, 1 Drawing Figure

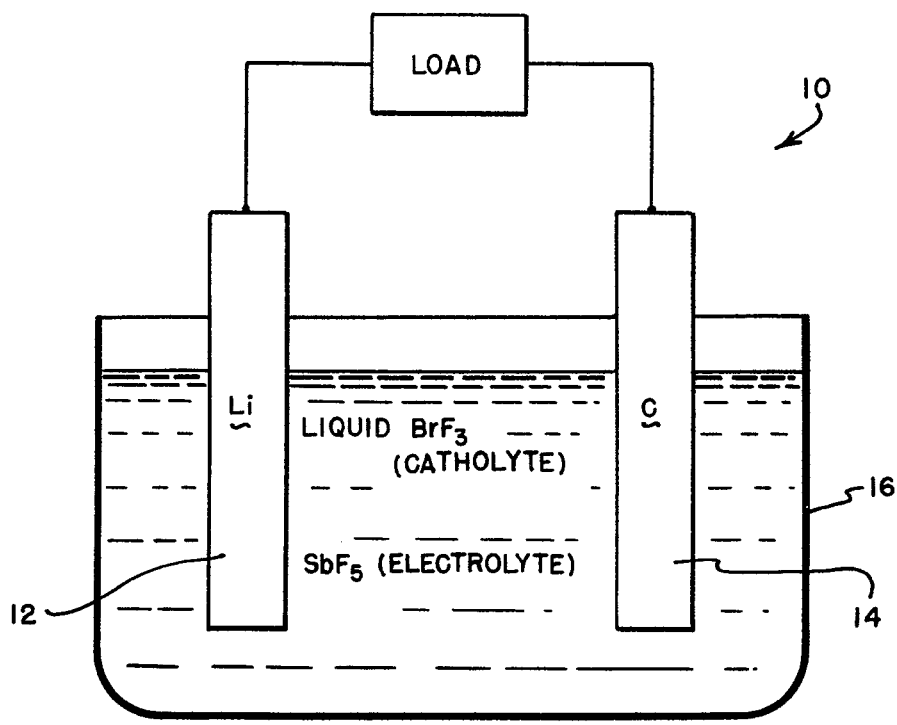

SUPER HIGH ENERGY DENSITY BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

There is a need for high energy density batteries for many applications, such as torpedoes, oceanographic or meteorological instrumentation, and field communications equipment. A lithium battery is a prime candidate for solving this problem. Lithium is an electronegative metal and has a low atomic weight, thereby making it capable of yielding high power per unit volume or mass. A high energy density battery of lithium would be desirable for many battery applications.

SUMMARY OF THE INVENTION

The present invention provides an extremely high energy density battery. This has been accomplished by providing a lithium anode, a catholyte of liquid bromine trifluoride, and an electrolyte of antimony pentafluoride.

OBJECTS OF THE INVENTION

An object of the present invention is to provide a super high energy density battery.

This and other objects of the invention will become more readily apparent from the ensuing specification when taken together with the drawing.

DESCRIPTION OF THE DRAWING

The drawing is a schematic illustration of a super high energy density battery.

DESCRIPTION OF THE PREFERRED EMBODIMENT

Half cell potentials of lithium and fluorine indicate a powerful battery, cell voltage of 5.895 volts. Because of the many problems associated with the handling of liquid fluorine it was decided to evaluate a fluorine containing interhalogen. Bromine trifluoride was chosen for testing because of desirable physical and electrical properties. Dip cell tests were performed using lithium as the anode and porous carbon as a current collector. These tests demonstrated that the lithium did passivate and did not inflame, the cathode was stable to the $BrF_3$ and an open cell voltage of 4.7 volts was obtained.

The chemistry of the lithium bromine trifluoride reaction is not well defined. It is known that bromine trifluoride disproportionates according to the following equation:

$$2\ BrF_3 \rightarrow BrF_2^+ + BrF_4^-$$

There are three probable cell reactions:

A. $4\ Li + BrF_3 \rightarrow 3\ Li^+F^- + Li^+Br^-$

B. $6\ Li + 2\ BrF_3 \rightarrow 6\ Li^+F^- + Br_2$

C. $6\ Li + 8\ BrF_3 \rightarrow 6\ Li^+BrF_4^- + Br_2$

Conductivity tests were performed on bromine trifluoride with several electrolytes at different concentrations with the following results:

| Electrolyte | Electrolyte Concentration (moles per liter) | Solvent | Specific Conductance [$ohm^{-1}\ cm^{-1}$(mhos)] |
|---|---|---|---|
| None | 0 | $BrF_3$ | $8.0 \times 10^{-3}$ |
| CsCl | 3 | $BrF_3$ | $3.7 \times 10^{-2}$ |
| $SbF_5$ | 1 | $BrF_3$ | $3.9 \times 10^{-2}$ |
| $SbF_5$ | 3 | $BrF_3$ | $5.7 \times 10^{-2}$ |
| $SbF_5$ | 5 | $BrF_3$ | $5.7 \times 10^{-2}$ |

Species formed upon solvation of electrolytes in $BrF_3$ are as follows:

$$CsF + BrF_3 \rightarrow Cs^+ + BrF_4^-$$

$$SbF_5 + BrF_3 \rightarrow BrF_2^+ + SbF_6^-$$

$$CsCl + BrF_3 \rightarrow Cs^+ + Br\ ClF_3^-$$

As illustrated in the drawing the battery 10 includes a lithium anode 12 and a current collector which may be a carbon electrode 14. These electrodes are schematically illustrated disposed in a casing 16 which contains a catholyte and an electrolyte. The catholyte preferably is solely liquid bromine trifluoride and the electrolyte is antimony pentafluoride which enables a super high energy density battery. The drawing is merely schematic and the battery can be made in any well known configuration, such as a "jelly roll".

Obviously, many modifications and variations of the present invention are possible in the light of the above teachings, and, it is therefore understood that within the scope of the disclosed inventive concept, the invention may be practiced otherwise than specifically described.

What is claimed is:

1. In a battery the improvement comprising:
   a lithium anode;
   a catholyte solely of liquid bromine trifluoride; and
   an electrolyte of antimony pentafluoride.

2. The improvement as claimed in claim 1 including:
   the antimony pentafluoride being a 3 mole concentration in the liquid trifluoride.

3. A high energy density battery consisting essentially of:
   a casing:
   a lithium anode;
   a catholyte of liquid bromine trifluoride;
   an electrolyte of antimony pentafluoride; and
   a current collector.

4. A battery as claimed in claim 3 further consisting essentially of:
   the antimony pentafluoride being a 3 mole concentration in the liquid trifluoride.

* * * * *